United States Patent
Chiu et al.

(10) Patent No.: US 10,664,943 B2
(45) Date of Patent: May 26, 2020

(54) COMPOUND SHADER OBJECT AND USE THEREOF

(71) Applicant: Apple Inc., Cupertino, CA (US)

(72) Inventors: Kelvin C. Chiu, San Jose, CA (US); Charles Brissart, San Jose, CA (US); Gokhan Avkarogullari, San Jose, CA (US); Lloyd A. Cunningham, Santa Clara, CA (US); Rahul U. Joshi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/989,404

(22) Filed: May 25, 2018

(65) Prior Publication Data

US 2018/0350028 A1    Dec. 6, 2018

Related U.S. Application Data

(60) Provisional application No. 62/514,702, filed on Jun. 2, 2017.

(51) Int. Cl.
*G06T 15/50* (2011.01)
*G06T 1/20* (2006.01)
*G06F 9/54* (2006.01)

(52) U.S. Cl.
CPC . *G06T 1/20* (2013.01); *G06F 9/54* (2013.01)

(58) Field of Classification Search
CPC ....... G06T 15/005; G06T 15/80; G06T 15/50; G06F 8/41; G06F 8/47; G06F 9/45516; G06F 8/76
See application file for complete search history.

(56) References Cited

U.S. PATENT DOCUMENTS

| | | | |
|---|---|---|---|
| 7,750,913 B1 | 7/2010 | Parenteau | |
| 9,465,660 B2 | 10/2016 | Schroth | |
| 2014/0237457 A1* | 8/2014 | Munshi | G06F 9/4843 717/140 |
| 2015/0169387 A1* | 6/2015 | Trofin | G06F 9/448 719/328 |
| 2015/0347107 A1* | 12/2015 | Munshi | G06F 8/47 717/147 |
| 2016/0078671 A1 | 3/2016 | Olsen | |
| 2017/0083298 A1 | 3/2017 | Kotas | |

\* cited by examiner

*Primary Examiner* — Hau H Nguyen
(74) *Attorney, Agent, or Firm* — Blank Rome LLP (57) ABSTRACT

The disclosed concepts provide a method to generate and use a compound shader object. A compound shader object includes a shader's intermediate representation (IR) and one or more binary modules; each binary module configured to execute on one type of graphics processing unit (GPU) with a specific input state. One method includes receiving, through a public application programming interface (API), a request to execute a shader from an user-level application. At the framework level, if the request corresponds to one of the prior compiled binary modules, that module may be passed to a GPU for immediate execution via a system private interface. If the request does not correspond to one of the binary modules, the shader's IR module may returned to the requesting user-level application (which module would then have to be compiled before it may be sent to the GPU).

19 Claims, 5 Drawing Sheets

COMPOUND SHADER OBJECT AND USE THEREOF

BACKGROUND

This disclosure relates generally to the use of graphics processing units (GPUs). More particularly, but not by way of limitation, this disclosure relates to a technique for generating and using a compound shader object which, in accordance with this disclosure, provides a compiled/binary shader for a variety of different GPUs at run-time without the need for a central processing unit (CPU) compilation operation.

Shaders may be thought of as mini-programs that define or implement a specific graphic operation. Some shaders (pixel or vertex shaders) manipulate those elements that are displayed. Other shaders (fragment or texture shaders) manipulate the area between the vertices (e.g., a portion of the displayed object's surface). A source-code shader may be compiled to a binary file or module so that it can execute directly on one type of GPU (e.g., a particular brand/model of GPU). Alternatively, a shader may be used to generate a GPU-independent intermediate representation (IR) module. At run-time, a binary shader module may be executed directly by a GPU while an IR shader module must first be compiled for the specific GPU model to which it will be sent. As might be expected, a binary shader program may be executed at run-time much more quickly than an identical shader program in IR representation.

Unfortunately, a shader program compiled to binary for a first GPU type is not generally executable by a different type of GPU. In addition, as GPU architectures tend to evolve or change very rapidly, shader programs compiled to binary for one version of a GPU may not even execute on another version of that same GPU (at least not so that it takes advantage of the features or capabilities introduced in the newer version). It would be beneficial to allow an application using shader programs to execute properly across different versions of one GPU type and, even, across different GPU types.

SUMMARY

The following summary is included in order to provide a basic understanding of some aspects and features of the claimed subject matter. This summary is not an extensive overview and as such it is not intended to particularly identify key or critical elements or to delineate the scope of the claimed subject matter. The sole purpose of this summary is to present some concepts of the claimed subject matter in a simplified form as a prelude to the more detailed description that is presented below.

In one embodiment the disclosed concepts provide a method to create a compound shader object. The method includes obtaining shader source code (using any desired shader language); compiling the shader source code into a plurality of binary modules, each binary module generated by compiling the shader source code with a unique set of run-time parameters (e.g., run-time parameters may identify the specific type (and version) of target graphics processing unit (GPU) and various run-time parameters such as, for example, shader type and render pipeline state); compiling the shader source code into an intermediate representation module; generating metadata identifying each of the binary modules and the intermediate representation module; combining the metadata, the intermediate representation module, and the plurality of binary modules into a compound shader object (e.g., as a single file or a series of database objects); and installing the compound shader object into a framework of an operating system.

In one or more other embodiments, the disclosed concepts also provide a method to use a compound shader object. The method includes receiving (through a public application programming interface, API), from an user-level application, a request to execute a shader on a specific type of GPU and with a specific set of run-time parameters; selecting, in response to the request: one of a plurality of pre-compiled binary modules from a compound shader object when the selected binary module corresponds to the shader, was compiled for the specific type of GPU and with the specific set of run-time parameters, and an intermediate representation module of the shader from the compound shader object when none of the plurality of pre-compiled binary modules is selected; sending (through a private system programming interface, SPI), to the GPU, the one pre-compiled binary module when the one pre-compiled binary module is selected; and returning, to the user-level application (via the API), the intermediate representation module when the intermediate representation module is selected. In one embodiment, the action of selecting may be from a single file object while in other embodiments, the action of selecting may be from a database or other data organization. In one or more embodiments, the actions of receiving, selecting, sending and returning may be performed by a framework-level application (as distinguished from a user-level application).

In one or more other embodiments, the various methods described herein may be embodied in computer executable program code or instructions and stored in a non-transitory storage device. In yet another embodiment, the method may be implemented in an electronic device having display capabilities.

DETAILED DESCRIPTION

This disclosure pertains to systems, methods, and computer readable media to improve the operation of graphics and display systems. In general, techniques are disclosed for providing compiled shader programs that execute on a wide variety of graphics processing units (GPUs); types and versions. More particularly, techniques disclosed herein generate binary shader modules using specific run-time parameter sequences or state during compilation operations. The binary modules are collected into a single object, along with an intermediate representation of the shader, to create a compound shader object (e.g., a file). The compound shader object may also include metadata to enable identification of the different shader modules included therein. When installed into a framework and used by a client application (e.g., a user-level application), the run-time behavior of that application may benefit as the number of platforms on which the shader call may be executed without the need for run-time compilation increases. As used herein, a framework may be thought of as a platform for developing software applications. For example, a framework may include predefined classes and functions that can be used to process input, manage hardware devices such as GPUs, and interact with system software. Illustrative frameworks include Cocoa for the macOS operating system and Cocoa Touch for the iOS operating system. (COCOA and COCOA TOUCH are registered trademarks of Apple Inc)

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developer's specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics processing systems having the benefit of this disclosure.

Figure 1:
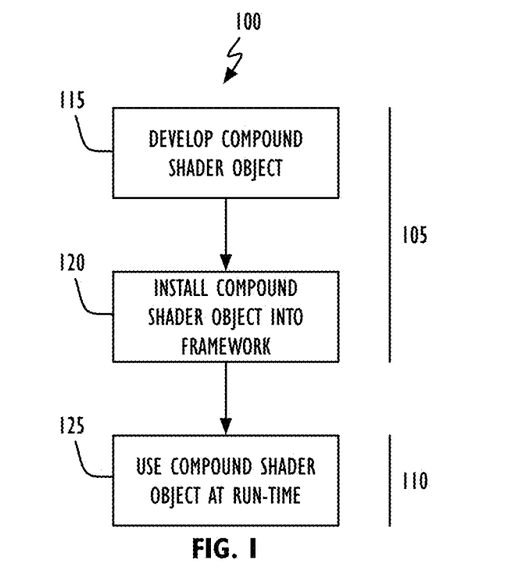
FIG. 1 shows, in flowchart form, a compound shader object operation in accordance with one or more embodiments.

Referring to FIG. 1, compound shader object operation 100 in accordance with one or more embodiments may be logically divided into two phases. Phase-1 105 is directed to the generation (block 115) and installation (block 120) of a compound shader object into a target operating system (OS). In one embodiment, for example, a compound shader object may be a file. In another embodiment, a compound shader object could be various database entries. In still other embodiments, a compound shader object could be obtained over a network connection (e.g., downloaded from a distal location. Phase-2 110 is directed to the run-time use of the compound shader object (block 125).

Figure 2:
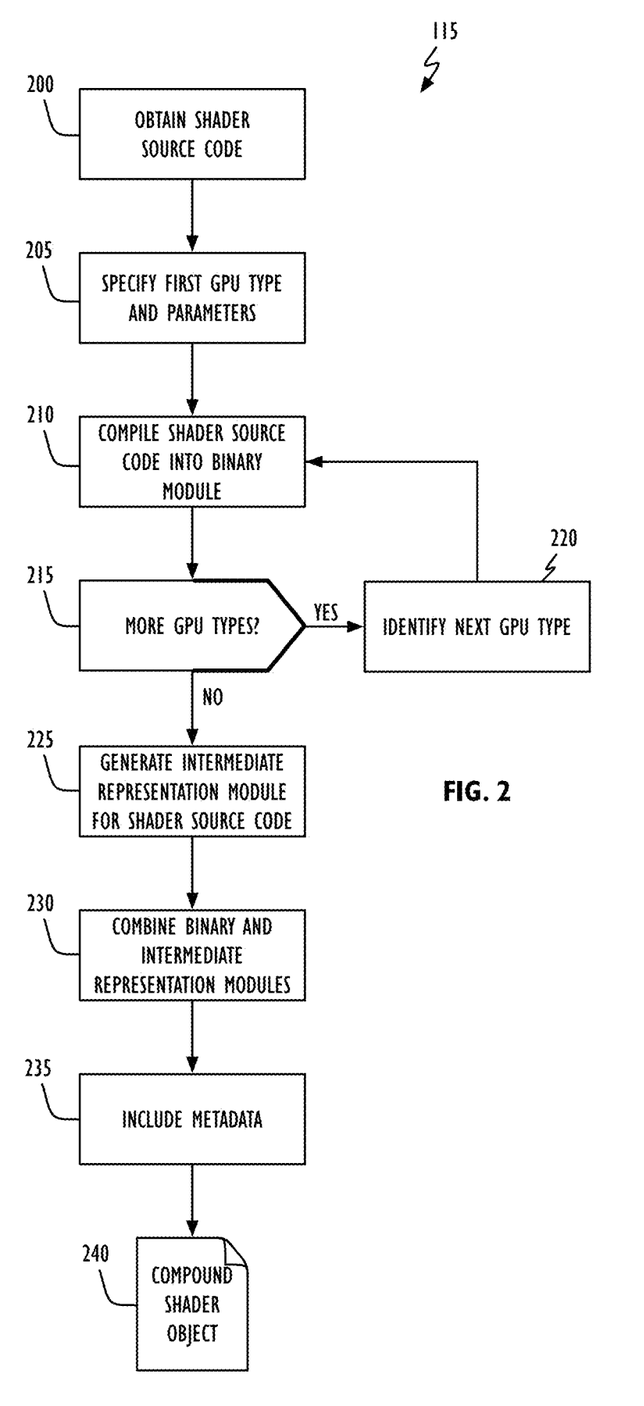
FIG. 2 shows, in flowchart form, a compound shader object generation operation in accordance with one or more embodiments.

Referring to FIG. 2, compound shader object generation operation 115 in accordance with one or more embodiments begins with the acquisition (or creation) of a shader's source code (block 200). In some embodiments, the shader may be written in the Metal shading language; a low-level, low-overhead hardware-accelerated graphics and compute application programming interface (API) from Apple Inc. In other embodiments, the shader may be written in the OpenGL shading language; a high-level shading language created by the OpenGL Architecture Review Board (ARB). In practice, the shader may be written in any computer executable language so long as it may be compiled to a machine-executable form that may be sent to, and used by, a target GPU. Once the shader's source code has been developed, its run-time parameters or state may be specified (block 205). One aspect of the run-time parameters may be the designation of the type and version of GPU the shader is to execute on. Other aspects of the run-time parameters or state may describe the type of shader (e.g., fragment or vertex), and various render pipeline and rasterization information. Table 1 identifies illustrative compile-time parameters for the Metal shading language's MTLRenderPipelineDescriptor object.

TABLE 1

| Run-Time Render Parameters or State Information |
|---|
| ShaderType |
| Fragment Shader<br>Vertex Shader<br>Render Pipeline State |
| Whether to use the default rendering pipeline state values for the descriptor<br>An array of attachments that store color data<br>Pixel format of an attachment that stores depth data<br>Pixel format of an attachment that stores stencil data<br>Rasterization and Visibility State |
| Number of samples in each fragment<br>Whether the alpha channel fragment output for an array of attachments that store color data is read and used to compute a sample coverage mask<br>Whether the alpha channel values for the array of attachments that store color data (see above) are forced to the largest representable value<br>Whether primitives are rasterized<br>Indicator of the type of primitive topology being rendered<br>Tessellation State |
| Maximum tessellation factor<br>Parameter to indicate whether the tessellation factor is to be scaled<br>The size of the control point indices in a control point index buffer<br>Tessellation step function (used to determine the tessellation factors for a patch from the tessellation factor buffer)<br>Winding order of triangles output by the tessellator<br>Partitioning mode use by the tessellator to derive the number and spacing of segments used to subdivide a corresponding edge<br>Run-Time Constants<br>Identifying Information |
| String(s) used to identify compiled shader object |

Figure 3:
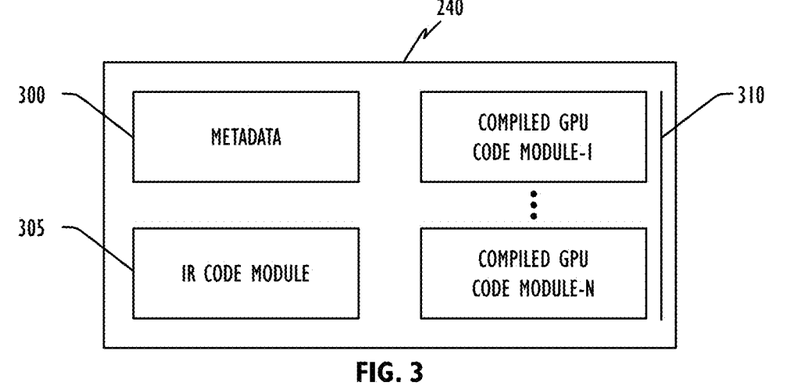
FIG. 3 shows, in block diagram form, a compound shader object in accordance with one or more embodiments.

With the proper run-time parameters and state specified, the shader may be compiled (block 210). A check may then be made to determine if the current shader has been compiled for all target GPUs (block 215). In one or more embodiments, a shader may be compiled for all GPUs (and their different versions) currently known or anticipated to be used for a given OS install. That is, the OS into which the final compound shader object is to be installed (see discussion below). If the shader's source code needs to be compiled for at least one more GPU (the "YES" prong of block 215), that GPU may be specified (block 220), where after compound shader object generation operation 115 continues at block 210. If the shader source code has been compiled for all target GPUs (the "NO" prong of block 215), an intermediate representation module for the shader (for the given parameters and state) may be generated (block 225). Next, the binary and IR shader modules may be combined (block 230) along with metadata describing each compiled binary module present (block 235) to generate compound shader object 240. Referring to FIG. 3, by way of example compound shader object 240 (in this case a single file) includes metadata 300 for each compiled module, IR module 305, and a series of binary code modules; each module optimized for a specific type and version of GPU and compiled with a specific set run-time parameters and state. In other embodiments, compound shader object 240 may be implemented as two or more files, as different database entries, or as a combination of files and database entries. In another embodiment, metadata 300 may also identify the software version that produced compound shader object 240. If a currently known version of software produces more efficient or faster binary code than a prior version, identification of that prior version (via metadata 300) may be used to trigger full compilation of IR module 305 even if a binary module with matching run-time parameters and state exists (e.g., is among compiled modules 310).

Figure 4:
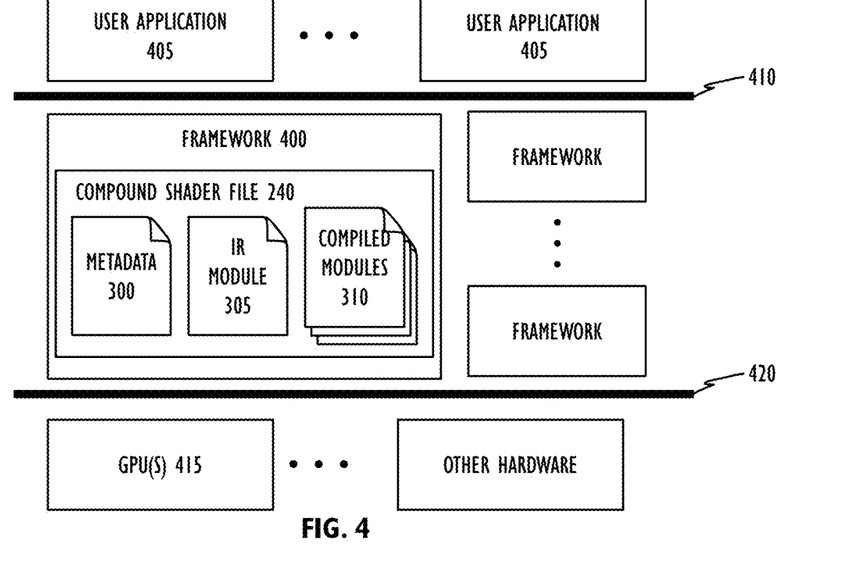
FIG. 4 shows, in block diagram form, a system architecture in accordance with one or more embodiments.

Referring to FIG. 4, in one embodiment compound shader object 240 may be installed or made part of one or more frameworks (e.g., framework 400). In accordance with this disclosure, frameworks can serve the same purpose as static and dynamic shared libraries. That is, they provide a library of routines that can be called by an application to perform specific tasks. As shown, user applications 405, such as game applications, access system resources through one or more frameworks (e.g., framework 400) through API 410. In the current context, framework 400 provides access to one or more GPUs 415 through a private system programming interface (SPI) 420. Once installed in the OS (e.g., as part of an initial OS install or through a software update operation), compound shader object 240 may be used by any application through API 410.

Figure 5:
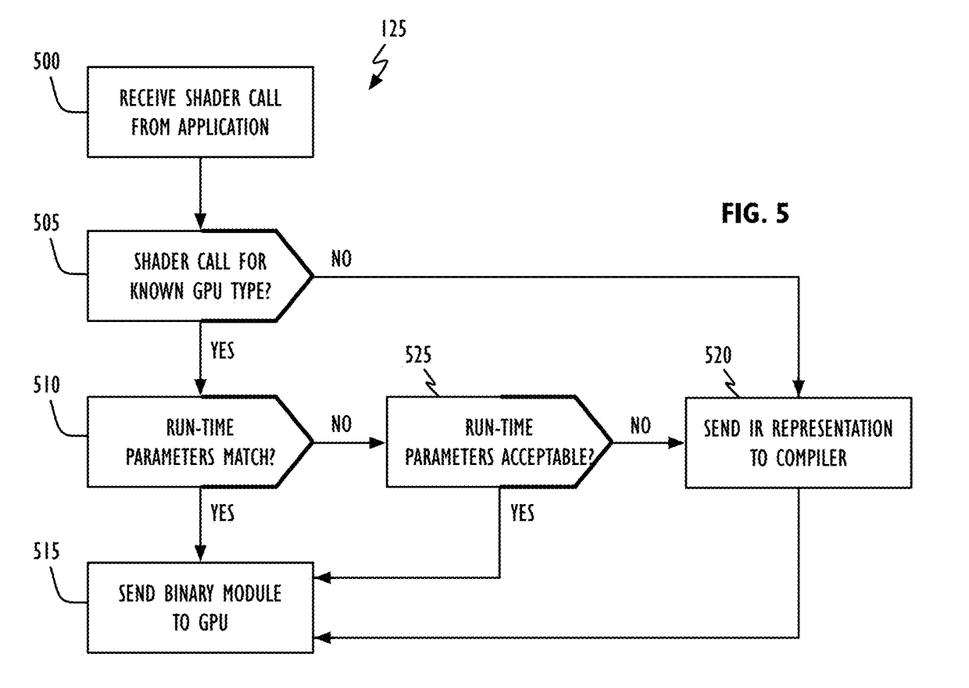
FIG. 5 shows, in flowchart form, compound shader object use operation in accordance with one or more embodiments.

Referring to FIG. 5, use operation 125 in accordance with this disclosure may begin when user application 405 sends a request to framework 400 through public API to execute a specific shader (block 500). If a check of the compound shader object's metadata 300 indicates the shader call is directed to a known GPU type (the "YES" prong of block 505), a further check may be made to determine if the shader's call parameters or state (received in accordance with block 500) match that used to generate one of compiled modules 310 (block 510). If the current call parameters or state match the parameter sequence or state used to compile one of binary modules (the "YES" prong of block 510), the appropriate binary module may be extracted from compound shader object 240 and sent to a GPU(s) via SPI 420 (block 515). The GPU may then directly execute the shader's binary module to generate an output that may be displayed on one or more display elements or screens. Returning to block 505, if the current shader call is directed to an unknown GPU type (the "NO" prong of block 505), the shader's IR module 305 may be extracted from compound shader object 240 and compiled (block 520), where after the compiled module could be sent to the GPU for execution (block 515). If the GPU type is known, but the call parameter sequence or state issued by user application 405 does not match that used to generate one of compiled modules 310 (the "NO" prong of block 510), a further check may be made to determine if the current call sequence or state is "close enough" so as to be useful (block 525). By way of example, the "state and parameters" for a given GPU architecture (call this GPU-n) may result in binary code (e.g., one of compiled modules 310) that writes frame buffer output in a given format. Later, a newer version of that GPU (call this GPU-(n+1)) architecture could decide to add a hardware block where all the frame buffer format is taken care of by that block. (The shader core needs only pass in 4 color components, where after the hardware block lays it out in the proper format.) In this example, GPU-n would need the run-time parameters to match exactly, GPU-(n+1) would not need the runtime parameter pertaining to frame buffer format to match at all. If such is the case (the "YES" prong of block 525), the appropriate one of compiled modules 310 may be extracted from compound shader object 240 where after operation 125 continues at block 515. If the call sequence or state is not sufficiently close (the "NO" prong of block 525), use operation 125 continues at block 520.

Figure 6:
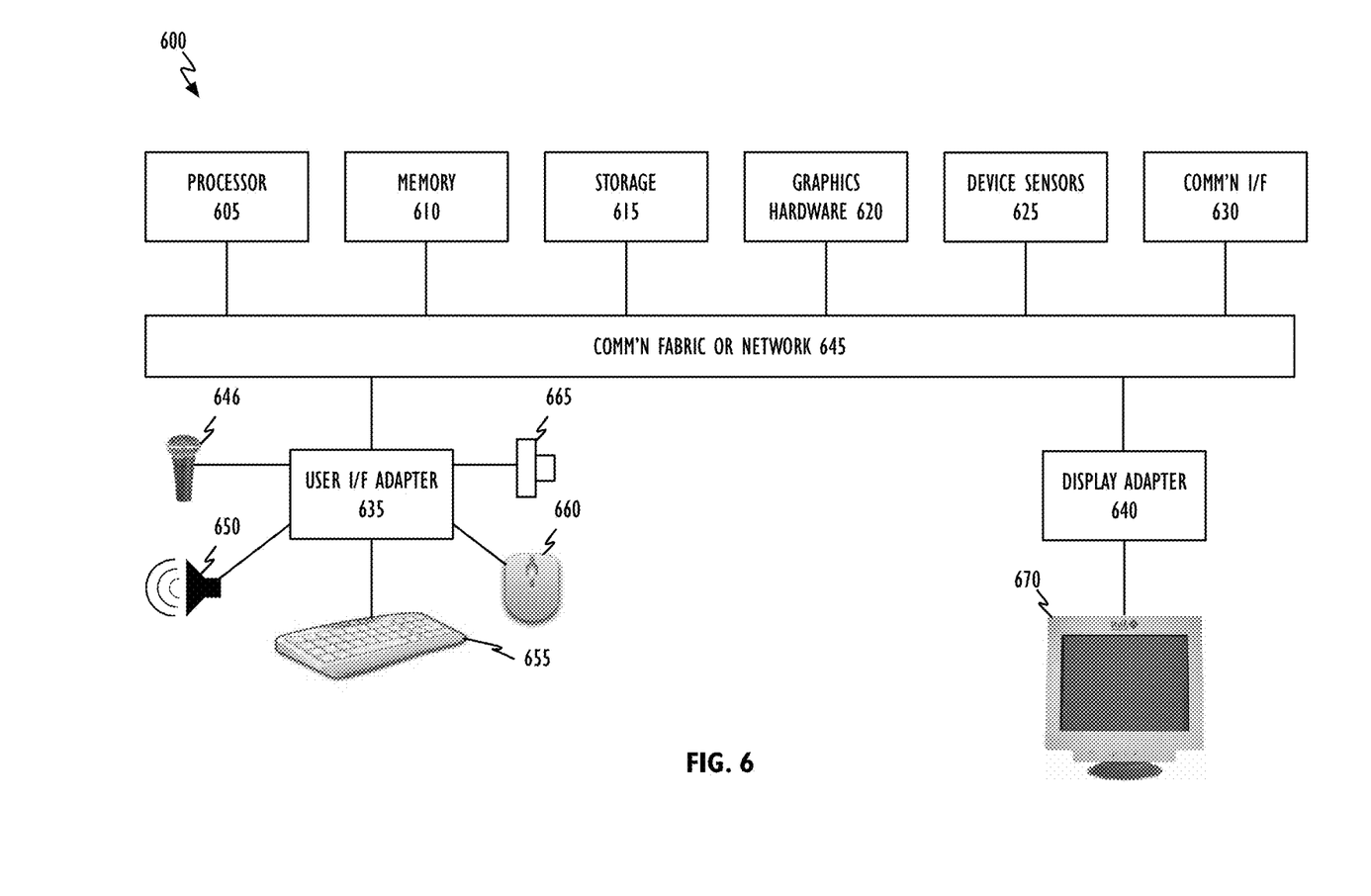
FIG. 6 shows, in block diagram form, a computer system in accordance with one or more embodiments.

Referring to FIG. 6, the disclosed compound shader object operations may be performed by representative computer system 600 (e.g., a general purpose computer system such as a desktop, laptop, notebook or tablet computer system). Computer system 600 may include processor element or module 605, memory 610, one or more storage devices 615, graphics hardware element or module 620, device sensors 625, communication interface module or circuit 630, user interface adapter 635 and display adapter 640—all of which may be coupled via system bus, backplane, fabric or network 645 which may be comprised of one or more switches or one or more continuous (as shown) or discontinuous communication links.

Processor module 605 may include one or more processing units each of which may include at least one central processing unit (CPU) and zero or more graphics processing units (GPUs); each of which in turn may include one or more processing cores. Each processing unit may be based on reduced instruction-set computer (RISC) or complex instruction-set computer (CISC) architectures or any other suitable architecture. Processor module 605 may be a single processor element, a system-on-chip, an encapsulated collection of integrated circuits (ICs), or a collection of ICs affixed to one or more substrates. Memory 610 may include one or more different types of media (typically solid-state) used by processor module 605 and graphics hardware 620. For example, memory 610 may include memory cache, read-only memory (ROM), and/or random access memory (RAM). Storage 615 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 610 and storage 615 may be used to retain media (e.g., audio, image and video files), preference information, device profile information, frameworks, computer program instructions or code organized into one or more modules and written in any desired computer programming language, and any other suitable data. When executed by processor module 605 and/or graphics hardware 620 such computer program code may implement one or more of the methods described herein. Graphics hardware 620 may be special purpose computational hardware for processing graphics and/or assisting processor module 605 perform computational tasks. In one embodiment, graphics hardware 620 may include one or more GPUs, and/or one or more programmable GPUs and each such unit may include one or more processing cores. In another embodiment, graphics hardware 620 may include one or more custom designed graphics engines or pipelines. Such engines or pipelines may be driven, at least in part, through software or firmware. Device sensors 625 may include, but need not be limited to, an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor, an electrostatic sensor, a temperature or heat sensor, a pixel array and a momentum sensor. Communication interface 630 may be used to connect computer system 600 to one or more networks or other devices. Illustrative networks include, but are not limited to, a local network such as a USB network, an organization's local area network, and a wide area network such as the Internet. Communication interface 630 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). User interface adapter 635 may be used to connect microphone 646, speaker 650, keyboard 655, pointer device 660, and other user interface devices such as image capture device 665 or a touch-pad (not shown). Display adapter 640 may be used to connect one or more display units 670 which may provide touch input capability.

Figure 7:
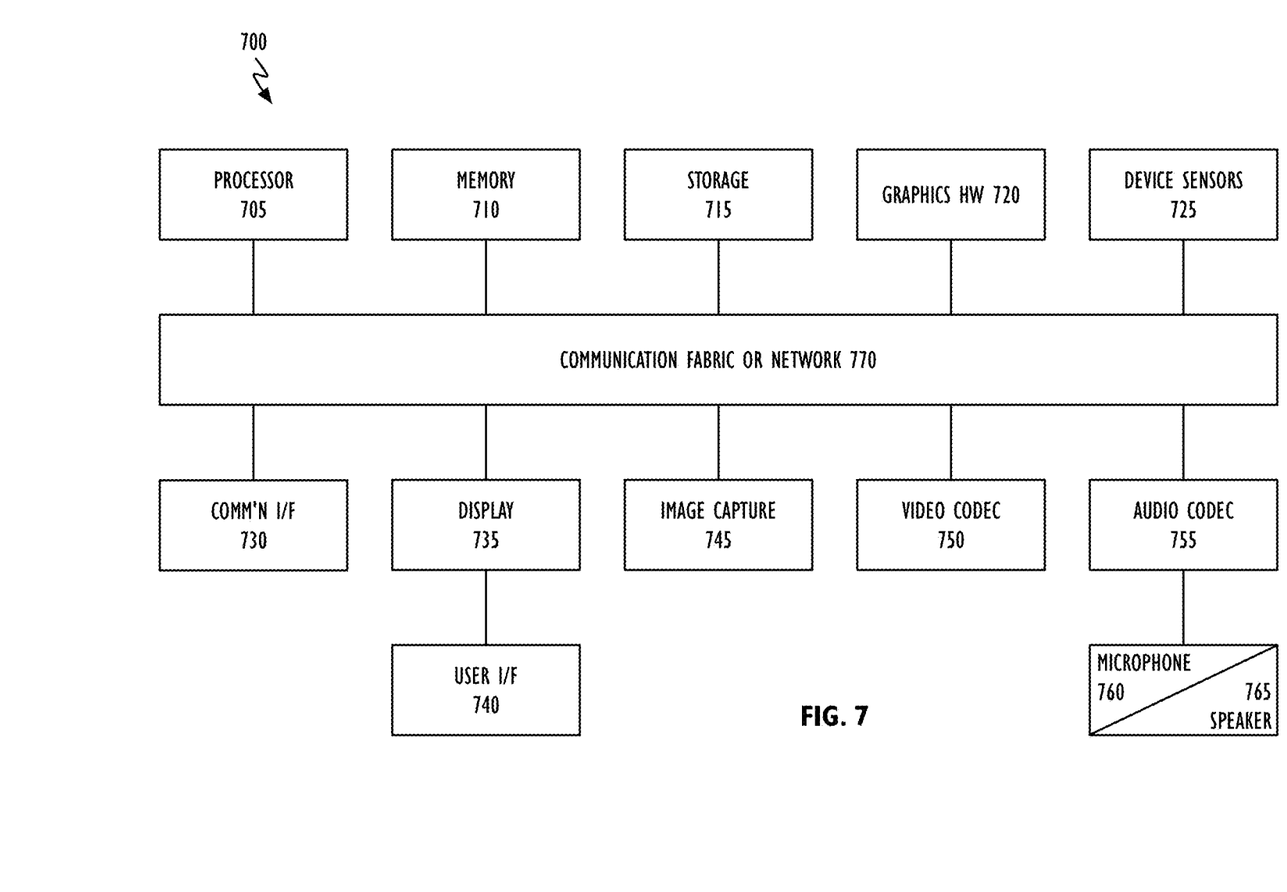
FIG. 7 shows, in block diagram form, a multi-function electronic device in accordance with one or more embodiments.

Referring to FIG. 7, the disclosed compound render file operations may also be performed by representative mobile electronic device 700. Electronic device 700 could be, for example, a mobile telephone, a personal media device or a tablet computer system. As shown, electronic device 700 may include processor element or module 705, memory 710, one or more storage devices 715, graphics hardware 720, device sensors 725, communication interface 730, display element 735 and associated user interface 740 (e.g., for touch surface capability), image capture circuit or unit 745, one or more video codecs 750, one or more audio codecs 755, microphone 760 and one or more speakers 765—all of which may be coupled via system bus, backplane, fabric or network 770. Processor element or module 705, memory 710, one or more storage devices 715, graphics hardware 720, device sensors 725, communication interface 730, display element 735 and associated user interface 740 may be of the same or similar type and serve the same function as the similarly named component described above with respect to computer system 600. Output from an image capture unit element or module may be processed, at least in part, by video codec 750 and/or processor module 705 and/or graphics hardware 720, and/or a dedicated image processing unit incorporated within image capture unit 745. Images so captured may be stored in memory 710 and/or storage 715. Audio signals obtained via microphone 760 may be, at least partially, processed by audio codec 755. Data so captured may also be stored in memory 710 and/or storage 715 and/or output through speakers 765.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions shown in FIGS. 1, 2 and 5 or the arrangement of elements shown in FIG. 3, 4, 6 or 7 should not be construed as limiting the scope of the disclosed subject matter. By way of example only, compound shader object 240 may not be realized in a single file object. Instead, in some embodiments compound shader object 240 may consist as a series of entries in a database. In one specific embodiment, a compound shader object 240 may only include metadata 300 with each compiled binary module and IR module stored in a database object. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A compound shader object method, comprising:
receiving, from an user-level application, a request to execute a shader program on a specific type of graphics processing unit (GPU) and with a specific set of run-time parameters;
obtaining a compound shader object, wherein the compound shader object comprises a single file object comprising: a plurality of pre-compiled binary modules for particular types of GPUs; and an intermediate representation module;
determining whether one of a plurality of pre-compiled binary modules from the compound shader object corresponds to the shader program and was compiled for the specific type of GPU with the specific set of run-time parameters; and
in accordance with a determination that none of the plurality of pre-compiled binary modules correspond to the shader program and were compiled for the specific type of GPU with the specific set of run-time parameters, returning, to the user-level application and based on the request, the intermediate representation module of the shader program from the compound shader object.

2. The compound shader object method of claim 1, further comprising:
in accordance with a determination that one of the plurality of pre-compiled binary modules from the compound shader object corresponds to the shader program and was compiled for the specific type of GPU with the specific set of run-time parameters, sending, to the GPU and based on the request, the one of the plurality of pre-compiled binary modules.

3. The compound shader object method of claim 2, wherein sending comprises sending the one of the plurality of pre-compiled binary modules to the GPU through a private system programming interface (SPI).

4. The compound shader object method of claim 1, wherein the compound shader object comprises the one of the plurality of pre-compiled binary modules in a first database entry and the intermediate representation module in a second database entry.

5. The compound shader object method of claim 1, wherein returning comprises returning the intermediate representation module to the user-level application through a public application programming interface (API).

6. The compound shader object method of claim 1, wherein receiving and returning are performed by a framework-level application.

7. A computer system, comprising:
    memory;
    a graphics processing unit (GPU) operationally coupled to the memory; and
    a central processing unit (CPU) operationally coupled to the memory and the GPU, the CPU configured to execute instructions stored in the memory to cause the computer system to—
        receive, from an application executing in a user-level of an operating system (OS) of the computer system, a request to execute a shader program on the GPU, the request including a specific set of run-time parameters,
        obtain a compound shader object, wherein the compound shader object comprises a single file object comprising: a plurality of pre-compiled binary modules for particular types of GPUs; and an intermediate representation module;
        compare, in response to the request, whether one of the plurality of pre-compiled binary modules from the compound shader object matches a shader and was compiled for the GPU and with the specific set of run-time parameters, and
        in accordance with a determination that none of the plurality of pre-compiled binary modules match the shader program and were compiled for the GPU with the specific set of run-time parameters, return, to the application, the intermediate representation module.

8. The computer system of claim 7, wherein the instructions further cause computer system to:
    in accordance with a determination that one of the plurality of pre-compiled binary modules from the compound shader object corresponds to the shader program and was compiled for the GPU with the specific set of run-time parameters, sending, to the GPU and based on the request, the one of the plurality of pre-compiled binary modules.

9. The computer system of claim 7, wherein the compound shader object comprises the one of the plurality of pre-compiled binary modules in a first database entry and the intermediate representation module in a second database entry.

10. The computer system of claim 8, wherein sending comprises sending the one of the plurality of pre-compiled binary modules to the GPU through a private system programming interface (SPI) of the OS.

11. The computer system of claim 7, wherein the instructions to return comprise instructions to return the intermediate representation module to the application through a public application programming interface (API) of the OS.

12. The computer system of claim 7, wherein the instructions to receive and return are performed by a framework-level application of the OS, wherein the user-level of the OS and a framework-level of the OS are different levels of the OS.

13. A non-transitory program storage device comprising instructions stored thereon to cause one or more central processing units (CPUs) to:
    receive, from an application executing in a user-level of an operating system (OS), a request to execute a shader program on a graphics processing element (GPU), the request including a specific set of run-time parameters,
    obtain a compound shader object, wherein the compound shader object comprises a single file object comprising:
        a plurality of pre-compiled binary modules for particular types of GPUs; and an intermediate representation module;
    select, in response to the request,
        one of the plurality of pre-compiled binary modules from the compound shader object when the selected pre-compiled binary module corresponds to the shader program, was compiled for the GPU and with the specific set of run-time parameters, and
        the intermediate representation module from the compound shader object when none of the plurality of pre-compiled binary modules is selected,
    send, to the GPU, the one of the plurality of pre-compiled binary modules when the one of the plurality of pre-compiled binary modules is selected; and
    return, to the application, the intermediate representation module when the intermediate representation module is selected.

14. The non-transitory program storage device of claim 13, wherein the instructions to receive comprise instructions to receive the request from the application through a public application programming interface (API) of the OS.

15. The non-transitory program storage device of claim 14, wherein the instructions to return comprise instructions to return the one of the plurality of pre-compiled binary modules to the application through the public API of the OS.

16. The non-transitory program storage device of claim 13, wherein the instructions to select comprise instructions to select the one of the plurality of pre-compiled binary modules from a first database entry or the intermediate representation module from a second database entry.

17. The non-transitory program storage device of claim 13, wherein the instructions to send comprise instructions to send the one of the plurality of pre-compiled binary modules to the GPU through a private system programming interface (SPI) of the OS.

18. The non-transitory program storage device of claim 13, wherein the instructions to receive, select, send and return are performed by a framework-level application of the OS, wherein the user-level of the OS and the framework-level of the OS are different levels of the OS.

19. A compound shader object generation method, comprising:
    obtaining shader source code;
    compiling the shader source code into a plurality of binary modules, each binary module generated by compiling the shader source code with a unique set of run-time parameters for a particular type of graphics processing unit (GPU);
    compiling the shader source code into an intermediate representation module;
    generating metadata identifying each of the binary modules and the intermediate representation module;
    combining the metadata, the intermediate representation module, and the plurality of binary modules into a compound shader object; and
    installing the compound shader object into a framework of an operating system.

* * * * *